United States Patent
Wager et al.

(10) Patent No.: US 8,699,455 B2
(45) Date of Patent: Apr. 15, 2014

(54) PROVIDING A SERVING HS-DSCH CELL CHANGE ACKNOWLEDGEMENT

(75) Inventors: Stefan Wager, Espoo (FI); Stephen Craig, Nacka (SE); Johan Bergman, Stockholm (SE); Edgar Ramos, Espoo (FI); Patrik Karlsson, Alta (SE); Claes Tidestav, Balsta (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 12/867,981

(22) PCT Filed: Jan. 23, 2009

(86) PCT No.: PCT/SE2009/050070
§ 371 (c)(1),
(2), (4) Date: May 20, 2011

(87) PCT Pub. No.: WO2009/116925
PCT Pub. Date: Sep. 24, 2009

(65) Prior Publication Data
US 2011/0274055 A1 Nov. 10, 2011

Related U.S. Application Data

(60) Provisional application No. 61/038,215, filed on Mar. 20, 2008.

(51) Int. Cl.
*H04W 36/00* (2009.01)
(52) U.S. Cl.
CPC .................. *H04W 36/0005* (2013.01)
USPC ........... 370/331; 370/329; 455/436; 455/437; 455/438; 455/439

(58) Field of Classification Search
USPC ........... 370/329, 331; 455/436, 437, 438, 439
See application file for complete search history.

(56) References Cited

U.S. PATENT DOCUMENTS

| | | | |
|---|---|---|---|
| 8,369,854 B2* | 2/2013 | Peisa et al. ..................... 455/436 |
| 2004/0146021 A1* | 7/2004 | Fors et al. ...................... 370/331 |
| 2006/0089142 A1 | 4/2006 | Vuorinen et al. | |
| 2006/0215607 A1* | 9/2006 | Mitchel et al. ................ 370/331 |
| 2007/0232312 A1* | 10/2007 | Gallagher et al. ............ 455/436 |
| 2008/0039090 A1* | 2/2008 | Jin et al. ........................ 455/436 |
| 2008/0045255 A1* | 2/2008 | Revel et al. ................... 455/510 |

(Continued)

OTHER PUBLICATIONS

3GPP TS 25.331 V.7.7.0 (Dec. 2007) "Release 7—RRC control messages" Dec. 2012, pp. 40, 42 and 43.*

(Continued)

*Primary Examiner* — Dang T Ton
*Assistant Examiner* — Robert M Morlan
(74) *Attorney, Agent, or Firm* — Myers Bigel Sibley & Sajovec, P.A.

(57) ABSTRACT

In an improved and reliable method and arrangement allowing a user equipment to acknowledge the re-pointing over target cell in the HS-DSCH serving cell change procedure, wherein a Media Access Control (MAC) frame include information indicates the acknowledgement. In one embodiment the MAC frame contains only the Scheduling Information (SI) field with a coding not normally used, e.g. TEBS=O and HLID=0 (TEBS=Total E-DCH Buffer Status; HLID=Highest Priority Logical Channel ID). Since the MAC frame is protected by Hybrid Automatic Repeat Request (HARQ), high reliability is ensured. Also, the MAC frame is transmitted to all cells in the active set, so that robustness is ensured also during imbalance situations.

8 Claims, 3 Drawing Sheets

(56) References Cited

U.S. PATENT DOCUMENTS

| | | | |
|---|---|---|---|
| 2008/0108326 A1* | 5/2008 | Park et al. | 455/411 |
| 2009/0086671 A1* | 4/2009 | Pelletier et al. | 370/329 |
| 2009/0086704 A1* | 4/2009 | Ho | 370/346 |

OTHER PUBLICATIONS

International Search Report, PCT Application No. PCT/SE2009/050070, May 6, 2009.

Written Opinion of the International Searching Authority, PCT Application No. PCT/SE2009/050070, May 6, 2009.

International Preliminary Report on Patentability, PCT Application No. PCT/SE2009/050070, May 7, 2010.

Samsung "HSDPA re-pointing" 3GPP TSG-RAN Meeting #48-bis, Cannes, France, $10^{th}$ Aug. 14-Oct. 2005, Tdoc R2-052528, 6 pp.

"Universal Mobile Telecommunications System (UMTS): Medium Access Control (MAC) protocol specification", ETSI TS 25.321 V7.7.0 (Jan. 2008), 151 pp.

Qualcomm Europe "Improving Reliability of HS-PDSCH Serving Cell Change Procedure" 3GPP TSG-RAN WG1 #52, Feb. 11-15, 2008, Sorrento, Italy, R1-080815, 8 pp.

Ericsson "HS-PDSCH Serving Cell Change Enhancements" 3GPP TSG RAN WG1#52bis, Shenzhen, China Mar. 31-Apr. 4, 2008, Tdoc R1-081544, 4 pp.

Ericsson "HS-PDSCH Serving Cell Change Enhancements" 3GPP TSG RAN WG1 Meeting #53, Kansas City, MO, USA May 5-9, 2008, R1-081883, 5 pp.

\* cited by examiner

PROVIDING A SERVING HS-DSCH CELL CHANGE ACKNOWLEDGEMENT

CROSS REFERENCE TO RELATED APPLICATIONS

This application is a 35 U.S.C. §371 national stage application of PCT International Application No. PCT/SE2009/050070, filed on 23 Jan. 2009, which itself claims priority to U.S. provisional patent Application No. 61/038,215, filed 20 Mar. 2008, the disclosure and content of both of which are incorporated by reference herein in its entirety. The above-referenced PCT International Application was published in the English language as International Publication No. WO 2009/116925 A1 on 24 Sep. 2009.

FIELD OF THE INVENTION

The present invention relates to a method and arrangement in a telecommunication system, in particular to an improved method and arrangement for a Serving HS-DSCH cell change acknowledgement.

BACKGROUND

In UTRAN (UMTS (Universal Mobile Telecommunications System) Terrestrial Radio Access Network) systems the high-speed downlink shared channel (HS-DSCH) does not use soft handover as dedicated channels do. Instead, a procedure called serving HS-DSCH cell change is utilized to make a hard handover. Soft handover is still used for the uplink, and the active set is managed in the same way as for non-HS User Equipments (UEs).

The signaling sequence for a serving HS-DSCH cell change is shown in FIG. 1. The procedure is triggered by a measurement report 1d from the UE to the Serving Radio Network Controller (SRNC), indicating that another cell in the active set has become the strongest. When the network receives the measurement report 1d, the network takes the decision to change the serving cell. To trigger a cell change, the network first configures source and target NodeBs with the new configuration and also configures the Iub transport bearer. When both source and target NodeBs have acknowledged the configuration, the network calculates the activation time for the new configuration in case the switch to the new configuration is a synchronized procedure, meaning that UE and network shall move to the new configuration at the same time. The activation time is set relative to the Connection Frame Number (CFN). An offset is needed to cover for the time it takes to transmit the re-configuration messages to the UE and the NodeBs. The cell change is performed at the activation time, and a Physical Channel Reconfiguration Complete message is transmitted from the UE on the new configuration to acknowledge the procedure.

For mobile stations travelling at very high speed, the link quality of the source cell may degrade before the cell change procedure to the target cell is completed. If this happens before the network is able to successfully transmit the Physical Channel Reconfiguration message, the network will no longer be able to reach the UE and the call will be dropped.

Consequently, a work item 3GPP Tdoc RP-080227, "HS-DSCH Serving Cell Change Enhancements" for Release 8 (Rel-8) has been started in the Third Generation Partnership Program (3GPP) RAN2 working group to identify and specify necessary enhancements to the HS-DSCH serving cell change procedure, focusing on necessary modifications to the:

a) Radio protocol procedures and structures
b) Iub/Iur protocols
c) UE, Base Station and Radio Resource Management (RRM) performance requirements In 3GPP Tdoc R2-081015, "Improving Reliability of HS-PDSCH Serving Cell Change", a solution is described in which the handover procedure is altered by transmitting the re-pointing in target cell. This is made possible by pre-loading UE and NodeBs in the active set with HS related configuration. When the UE has transmitted the 1d measurement report, it starts to monitor HS-DSCH Shared Control Channel (HS-SCCH) from both source and target cell in parallel. When the Radio Network Controller (RNC) receives the 1d measurement report, it starts bi-casting data to source and target NodeB, and tells the target NodeB to indicate the cell change to the UE by scheduling it on HS-SCCH. When the UE sees the scheduling on HS-SCCH in the target cell, it shall interpret this as an implicit cell change command, and change configuration to that of the target cell. This includes also the Up-Link (UL), so that it starts to measure Channel Quality Indicator (CQI) from the target cell, and also adjusts the timing of the HS-DSCH (related uplink) Dedicated Physical Control Channel (HS-DPCCH) to the target cell. However the UE has to acknowledge that it received the HS-SCCH re-pointing and has moved to the target cell. In 3GPP Tdoc R2-081015, "Improving Reliability of HS-PDSCH Serving Cell Change", two alternatives are presented.

a) The UE is provided two uplink scrambling codes as part of Radio Resource Control (RRC) Connection Setup or Cell Update Confirm. These scrambling codes are also provided by the RNC to Node Bs in the UE's active set. By changing the UL scrambling code, the UE indicates to the network that the Cell change procedure is completed. A drawback with this solution is that it requires extra hardware in all cells in the active set to listen for the new scrambling code, while still receiving the old.

b) By sending CQI 31, which is an unused value. The drawback with this solution is mainly robustness. The CQI is transmitted on physical layer, without support for retransmissions. Under severe imbalance situations, when the serving cell is no longer the strongest cell in the active set problems can arise. As power control regulates the transmit power to the strongest cell in the active set, imbalance may lead to the situation where the serving cell is not able to decode the UE transmission, there may thus be a need for an additional Layer 3 (L3) confirmation. The L3 confirmation would be a Radio Resource Control (RRC) message that has to be routed to the RNC, thus increasing the delay until it reaches the NodeB.

Hence there is a need for an improved and more reliable method and arrangement that allows a user equipment to acknowledge the re-pointing over target cell in the HS-DSCH serving cell change procedure.

SUMMARY

It is an object of the present invention to achieve an improved and reliable method and arrangement that allows a user equipment to acknowledge the re-pointing over target cell in the HS-DSCH serving cell change procedure.

This object and others are obtained by the method User Equipment Method and NodeB as set out in the appended claims. Briefly, the present invention provides a procedure where a Media Access Control (MAC) frame includes information indicating the acknowledgement. In one embodiment the MAC frame is containing only the Scheduling Information (SI) field with a coding not normally used, e.g. TEBS=0 and HLID!=0. Since the MAC frame is protected by Hybrid Automatic Repeat Request (HARQ), high reliability is ensured. Also, the MAC frame is transmitted to all cells in the active set, so that robustness is ensured also during imbalance situations.

In an alternative procedure is also presented, the acknowledgement could be accomplished by sending an E-DPCCH sub-frame without an accompanying E-DPDCH transmission, or by sending an E-DPDCH sub-frame without an accompanying E-DPCCH transmission, or switch the UL DPCCH slot format either temporarily or permanently.

The invention extends also to a method in a User Equipment, a User Equipment, a method in a Node B and a NodeB for implementing the procedure as described above.

As an advantage, the present invention provides more reliable and less costly means to acknowledge the serving HS-DSCH cell change command than the ones presented in for example 3GPP Tdoc R2-081015, "Improving Reliability of HS-PDSCH Serving Cell Change".

Other objects, advantages and novel features of the invention will become apparent from the following detailed description of the invention when considered in conjunction with the accompanying drawings.

BRIEF DESCRIPTION OF THE DRAWINGS

For a better understanding, reference is made to the following drawings and preferred embodiments of the invention.

DETAILED DESCRIPTION

The present invention may, of course, be carried out in other ways than those specifically set forth herein without departing from essential characteristics of the invention. The present embodiments are to be considered in all respects as illustrative and not restrictive.

In the below exemplary description of some embodiments the HS-DSCH serving cell change procedure is performed as described in the background section above up to the point where the UE shall acknowledge the receipt of the HS-SCCH or S-CCCH re-pointing.

Figure 1:
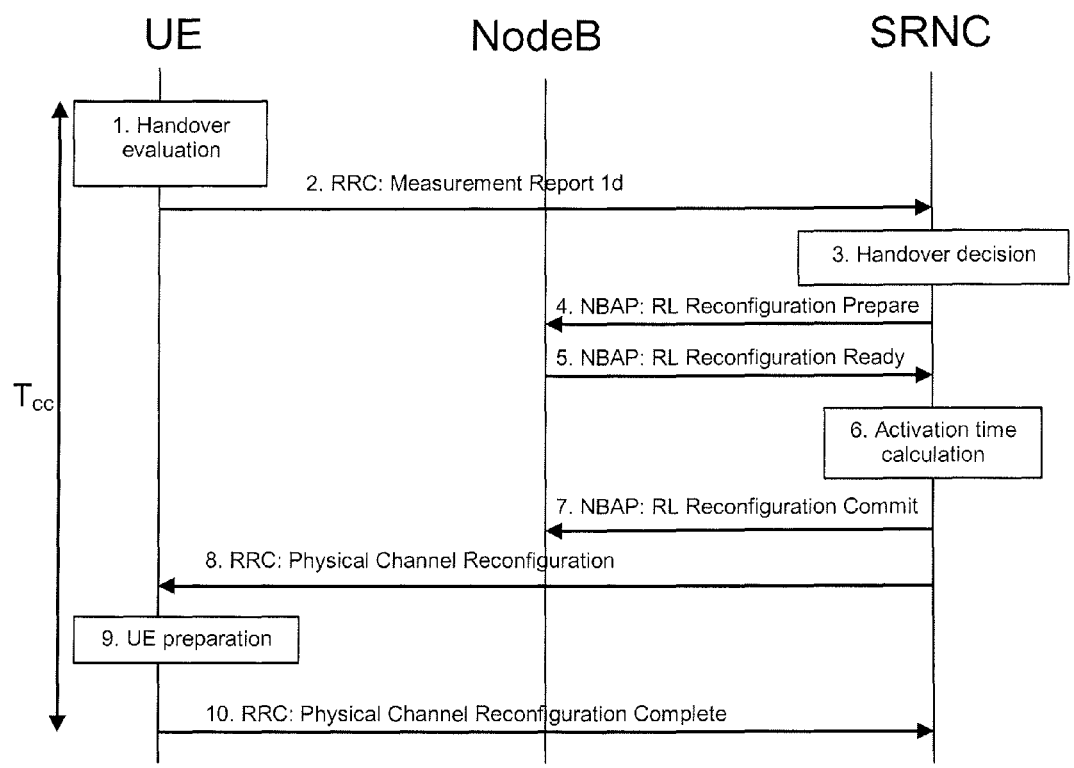
FIG. 1 shows the signaling procedure for serving HS-DSCH cell change.
Figure 2:
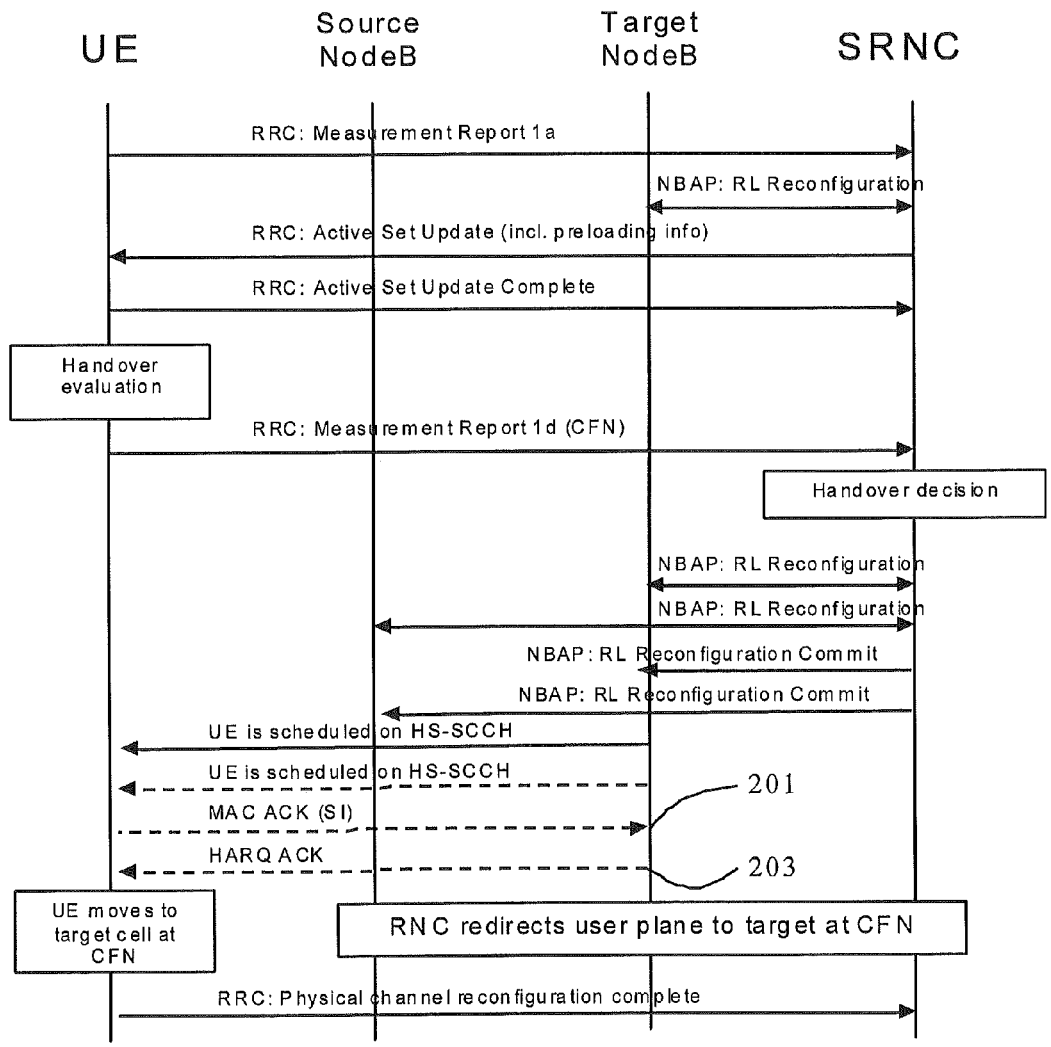
FIG. 2 shows a signaling procedure where a serving HS-DSCH cell change acknowledgement is indicated by sending a MAC PDU.

In a first embodiment the acknowledgement procedure is performed using an acknowledgement sent in a MAC Packet data unit (PDU) as depicted in FIG. 2. This may be referred to as a MAC acknowledgement. The serving HS-DSCH cell change acknowledgement is indicated by sending a MAC PDU from the UE to the target NodeB in a step 201 containing information indicating the acknowledgement. The indication can for example be that the MAC PDU includes Scheduling Information (SI) field with TEBS=0 and HLID!=0, or some other values not normally used. TEBS=0 and HLID!=0 is not allowed according to the 3GPP Rel-7 specification, and can thus be reserved for the specific purpose of acknowledging the serving HS-DSCH cell change command on HS-SCCH in Rel-8. As an alternative, any other coding not normally used in the current specification could be used instead of TEBS=0 and HLID!=0.

As MAC is used, the serving HS-DSCH cell change acknowledgement will be covered by HARQ retransmissions as indicated by a HARQ acknowledgement in step 203 that will provide good reliability. To ensure the acknowledgement reaches both the source and the target cell, the HARQ can be continued until an ACK is received by the target cell. When the target cell receives the MAC PDU with SI, indicating HS-DSCH serving cell change acknowledgement, the target NodeB can start scheduling data to the UE. The target cell informs the RNC over Iub that the cell change is completed. The RNC then stops transmitting data to the source cell, and deletes the downlink radio links from the source cell. In this embodiment to UE can move to the target cell configuration once it receives the HARQ ACK for the MAC PDU with SI.

To minimize Uu load, the source cell can also be adapted to stop scheduling data to the UE when it receives the MAC PDU with SI indicating HS-DSCH serving cell acknowledgement. However, this may lead to data interruption in case the source cell receives the acknowledgement before the target cell.

If the HARQ fails for some reason, the measurement report 1d can be transmitted again to trigger a new handover.

There is one error scenario for the proposed procedure that requires some attention. A NACK to ACK error will cause the UE to believe the serving HS-DSCH cell change acknowledgement was received by the target NodeB, although this is not the case. This will lead to a situation where the UE believes the cell change is successfully completed, but the NodeB still awaits the acknowledgement. In this case, the target cell can be adapted to schedule the UE again after a certain time from sending the initial indication on HS-SCCH as a fall-back.

Furthermore, the following can be done to increase robustness:

increase the transmit power of the HS serving cell change acknowledgement from the UE, increase the transmit power of the HARQ ACK from the NodeB.

transmit only the HS serving cell change acknowledgement in a particular Transmission Time Interval (TTI). That is, no other data other than the HS serving cell change acknowledgement is transmitted in the TTI.

Figure 3:
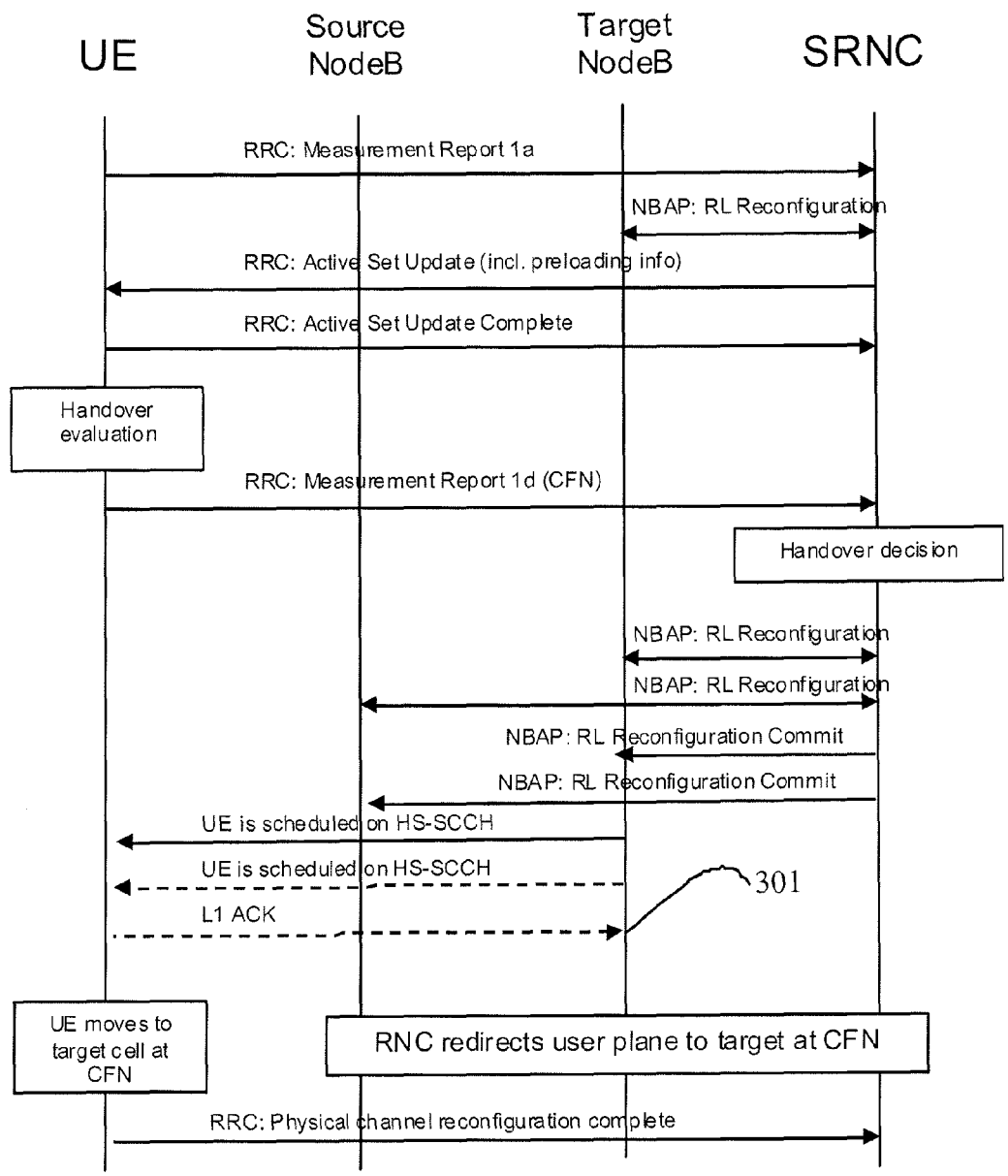
FIG. 3 shows a signaling procedure where a serving HS-DSCH cell change acknowledgement is indicated by sending a Layer 1 acknowledgement.

In another embodiment, the serving HS-DSCH cell change acknowledgement is indicated in a Layer 1 acknowledgement as shown in step 301 in FIG. 3. This can for example be achieved by transmitting the E-DPCCH without the E-DPDCH data part, or by transmitting the E-DPDCH without the E-DPCCH control part. This is not specified in the current specification, and can thus be reserved for the specific purpose of acknowledging the serving HS-DSCH cell change command on HS-SCCH in Rel-8.

As an alternative, the acknowledgement can also be indicated by switching to a new slot format on UL DPCCH.

Using the methods and User equipments as described herein will provide an improved and more robust method of generating a HS-DSCH cell change acknowledgement.

The invention claimed is:

1. A method implemented by a User Equipment (UE), the method comprising:

acknowledging, prior to the UE moving to a target cell, a change in a serving high-speed downlink shared channel, HS-DSCH, cell to a NodeB of the target cell when the serving HS-DSCH cell is changed from a serving cell to the target cell of a cellular radio system by transmitting a Media Access Control, MAC, frame including information indicating acknowledgement of the change of serving HS-DSCH cell;

receiving a Hybrid Automatic Repeat Request acknowledgment for the MAC frame including information indicating acknowledgement of the change of serving HS-DSCH cell; and moving and configuring the user equipment to the target cell in response to receiving the Hybrid Automatic Repeat Request acknowledgment, wherein the MAC frame comprises a Scheduling Information field with a coding not allowed according to the third generation partnership project, 3GPP, release 7, Rel-7, specification.

2. A method implemented by a User Equipment (UE), the method comprising:

acknowledging, prior to the UE moving to a target cell, a change in a serving high-speed downlink shared channel, HS-DSCH, cell to a NodeB of the target cell when the serving HS-DSCH cell is changed from a serving cell to the target cell of a cellular radio system by transmitting a Media Access Control, MAC, frame including information indicating acknowledgement of the change of serving HS-DSCH cell, wherein the MAC frame comprises a Scheduling Information field with a coding not allowed according to the third generation partnership project, 3GPP, release 7, Rel-7, specification, wherein the Scheduling Information Field comprises TEBS equal to 0 and HLID not equal to 0, wherein TEBS is Total E-DCH Buffer Status, and HLID is Highest priority Logical ID.

3. The method according to claim 2, receiving a Hybrid Automatic Repeat Request acknowledgment for the MAC frame including information indicating acknowledgement of the change of serving HS-DSCH cell; and moving and configuring the user equipment to the target cell in response to receiving the Hybrid Automatic Repeat Request acknowledgment.

4. A User Equipment (UE) comprising:

circuitry adapted to acknowledge, prior to the UE moving to a target cell, a change in a serving high-speed downlink shared channel, HS-DSCH, cell to a NodeB of the target cell when the serving HS-DSCH cell is changed from the serving cell to the target cell of a cellular radio system, the circuitry acknowledging the change by transmitting a Media Access Control, MAC, frame including information indicating acknowledgement of the change of serving HS-DSCH cell;

circuitry adapted to receive a Hybrid Automatic Repeat Request acknowledgment for the MAC frame including information indicating acknowledgement of the change of serving HS-DSCH cell; and circuitry adapted to move and configure the user equipment to the target cell in response to receiving the Hybrid Automatic Repeat Request acknowledgment, wherein the MAC frame comprises a Scheduling Information field with a coding not allowed according to the third generation partnership project, 3GPP, release 7, Rel-7, specification.

5. A User Equipment (UE) comprising:

circuitry adapted to acknowledge, prior to the UE moving to a target cell, a change in a serving high-speed downlink shared channel, HS-DSCH, cell to a NodeB of the target cell when the serving HS-DSCH cell is changed from the serving cell to the target cell of a cellular radio system, the circuitry acknowledging the change by transmitting a Media Access Control, MAC, frame including information indicating acknowledgement of the change of serving HS-DSCH cell, wherein the MAC frame comprises a Scheduling Information field with a coding not allowed according to the third generation partnership project, 3GPP, release 7, Rel-7, specification, and wherein the Scheduling Information Field comprises TEBS equal to 0 and HLID not equal to 0, wherein TEBS is Total E-DCH Buffer Status, and HLID is Highest Priority Logical ID.

6. The User Equipment according to claim 5, circuitry adapted to receive a Hybrid Automatic Repeat Request acknowledgment for the MAC frame including information indicating acknowledgement of the change of serving HS-DSCH cell; and circuitry adapted to move and configure the user equipment to the target cell in response to receiving the Hybrid Automatic Repeat Request acknowledgment.

7. A NodeB comprising:

circuitry adapted to receive an acknowledgment, prior to a User Equipment (UE) moving to a target cell, of a change in a serving high-speed downlink shared channel, HS-DSCH, cell from the UE, wherein the acknowledgement is received in a Media Access Control, MAC, frame including information indicating acknowledgement of the change of serving HS-DSCH cell, the circuitry is further adapted to respond to the acknowledgment by starting scheduling of data to the User equipment when the Node B is associated with the target cell;

circuitry adapted to respond to a Scheduling Information field of the MAC frame as the information indicating acknowledgement of the change of serving HS-DSCH cell, wherein the Scheduling Information field has a coding not allowed according to the third generation partnership project, 3GPP, release 7, Rel-7, specification, wherein the Scheduling Information field comprises TEBS equal to 0 and HLID not equal to 0, wherein TEBS is Total E-DCH Buffer Status, and HLID is Highest Priority Logical ID.

8. A method implemented by a NodeB, the method comprising:

receiving at the NodeB an acknowledgment of a change in a serving high-speed downlink shared channel, HS-DSCH, cell from a User equipment (UE) wherein the acknowledgement is received in a Media Access Control, MAC, frame including information indicating acknowledgement of the change of serving HS-DSCH cell; and responsive to receipt of the acknowledgment, prior to the UE moving to a target cell, starting scheduling of data to the User equipment when the Node B is associated with the target cell, wherein the scheduling of data to the User equipment is started responsive to a Scheduling Information field of the MAC frame that has a coding not allowed according to the third generation partnership project, 3GPP, release 7, Rel-7, specification, wherein the Scheduling Information field comprises TEBS equal to 0 and HLID not equal to 0, wherein TEBS is Total E-DCH Buffer Status, and HLID is Highest Priority Logical ID.

* * * * *